June 11, 1963  R. W. SCHAEFER  3,093,362
JACK ASSEMBLY
Filed Feb. 19, 1962
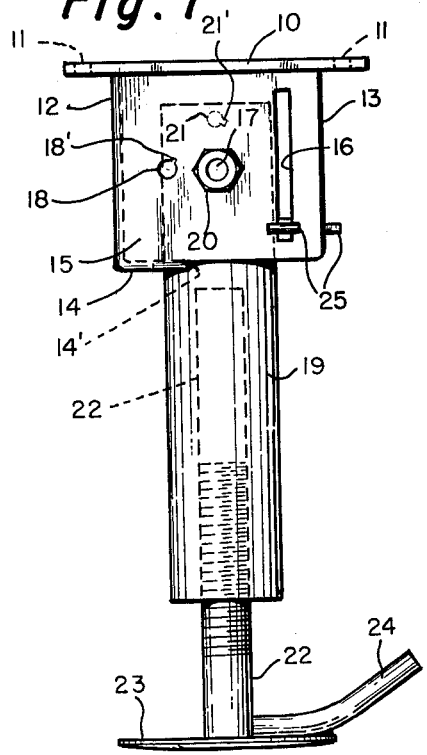
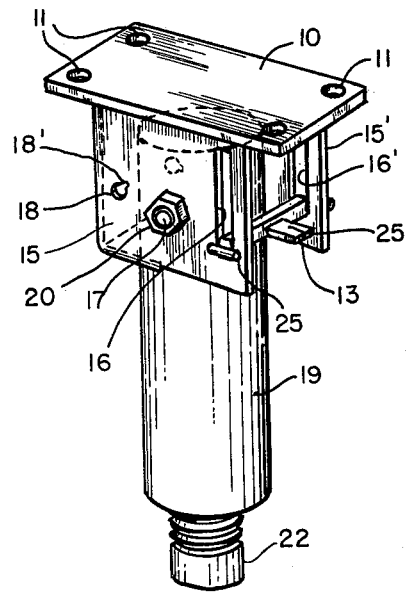
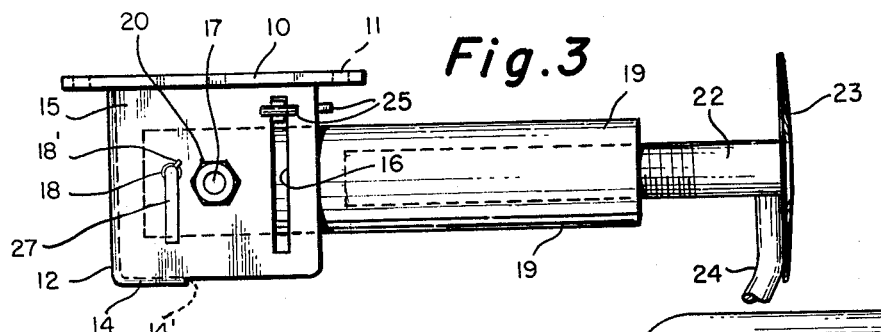
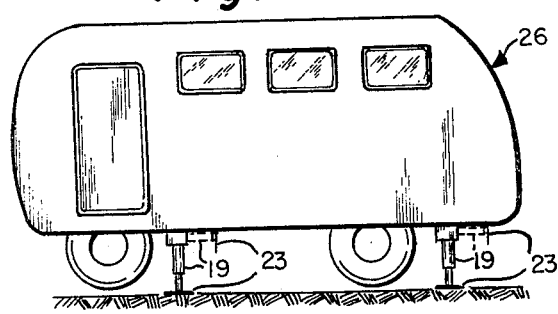
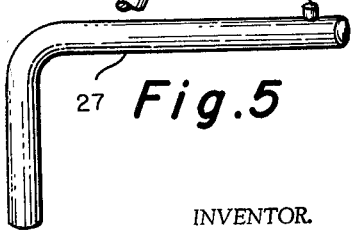
INVENTOR.
Reuben W. Schaefer
BY  *Morsell + Morsell*
Attorneys

United States Patent Office 3,093,362
Patented June 11, 1963

3,093,362
JACK ASSEMBLY
Reuben W. Schaefer, Rte. 2, Kewaskum, Wis.
Filed Feb. 19, 1962, Ser. No. 173,936
4 Claims. (Cl. 254—86)

This invention relates to an improved jack assembly, and more particularly to a novel jack which is adapted to be permanently mounted on a house trailer or the like.

Ordinarily, in the use of house trailers it is common practice to elevate the trailer at night, or when it is not being used for travel, and to position concrete blocks or the like under the frame. The reason for this tedious procedure is that if the trailer is allowed to rest directly on its wheels there is considerable tilting and rocking of the same when its occupants move about, which is disconcerting. Heretofore, attempts have been made to design permanent jacks for such trailers which would not only raise the trailer but would support the same in its elevated position, thus eliminating the need for laboriously mounting blocks or the like under the frame. Unfortunately, however, none of such permanent jack devices have proven entirely satisfactory for their intended purpose. For one thing, all of said permanent jacks have been relatively expensive in construction, and complicated to operate. Moreover, such jacks have been so designed that it is difficult to shift them to and lock them in an unobstructing position when the trailer is to be used for travel.

With the above considerations in mind, the principal objects of the present invention are to provide a novel jack assembly for the purpose described, wherein the jack is relatively simple and inexpensive in design, wherein the jack is easy to operate, and wherein said jack can be readily reliably secured either in its load-supporting position or in an unobstructing position where it will not affect the operation or appearance of the trailer.

A further object of the invention is to provide a permanent jack assembly for trailers as described, which is durable and rugged in construction and which is well adapted to stand up under hard use and adverse conditions.

A still further object is to provide a novel jack assembly which is especially designed for use with house trailers, and which is particularly well suited therefor as described, but which jack assembly may also be advantageously employed on other types of trailers, or on any other vehicle or device wherein a permanent jack might be utilized.

With the above and other objects in view, the present invention comprises the improved jack assembly, and all of its parts and combinations, as set forth in the following specification and claims.

In the accompanying drawing, wherein the same reference numerals designate the same parts in all of the views:

FIG. 1 is a side elevational view of the improved jack in its load-supporting position;

FIG. 2 is a fragmentary perspective view;

FIG. 3 is a side elevational view of the jack in its raised, unobstructing position;

FIG. 4 is a side elevational view showing jacks of the type comprising the present invention mounted on a house trailer; and FIG. 5 is an elevational view of the locking key employed in the present assembly.

With more particular reference now to the drawing, the numeral 10 designates a mounting plate forming the top of the present jack assembly, said plate having a plurality of apertures 11 therethrough and being adapted to be bolted or otherwise permanently secured to the underside of a house trailer or other structure. Like the rest of the improved jack assembly hereinafter described, said mounting plate 10 is formed of steel or similar strong, durable material in order to provide a unit which is well adapted to withstand both hard use and the elements.

Depending from the plate 10 is a box-like bracket structure having a back wall 12, an open front face 13, a partial bottom wall 14, and a pair of spaced, parallel side walls 15 and 15'. Said side walls 15 and 15' are provided with aligned, vertical slotted openings 16 and 16' therethrough adjacent their forward edges, which slots extend substantially the entire height of said walls, and formed in and through the central portion of said wall members are aligned apertures through which a bolt 17 is projected, as will be hereinafter described. Adjacent the back edges of said bracket side walls 15 and 15' intermediate their heights are a pair of aligned apertures 18 which are generally circular in form but each of which is provided with a small extension 18' projecting forwardly and upwardly at an angle therefrom, said aperture extensions also being in alignment in said walls.

The upper end portion of a tubular leg member 19 is positioned between said bracket side walls 15 and 15', said leg having a transverse bore spaced from its upper end through which the aforementioned bolt 17 is projected to pivotally secure said leg to and between said walls, and there being a retaining nut 20 on the outer end of said bolt. Formed in and through said leg 19 adjacent its upper end is an aperture 21 having an extension 21' (FIG. 1), which aperture is so positioned that it will register with the aforementioned apertures 18 in the bracket walls 15 and 15' when said leg is pivoted from its normal, load-supporting position of FIGS. 1 and 2 to a horizontal position as shown in FIG. 3.

The aforementioned partial bottom wall 14 of the bracket extends forwardly from the back face of said bracket to the approximate center thereof (FIGS. 1 and 3), and has a concavely curved forward or leading edge 14'. Consequently, when the pivotal leg 19 is in its vertical, load-supporting position it will abut against said edge 14' and will be prevented thereby from swinging further rearwardly. Cooperating therewith is a retaining bar 25 which is vertically slidably carried by and in spanning relationship between the aforementioned elongated slots 16 and 16' adjacent the forward edge of the bracket side walls 15 and 15', said retaining bar being designed to prevent forward swinging movement of said leg 19 when the latter is in its load-supporting position, as will be hereinafter described in greater detail.

The lower end portion of the tubular leg member 19 is internally threaded, as appears in FIG. 1, and threaded into the same and projecting therefrom, is a shaft 22, the threaded nature of said interfitting leg and shaft members permitting the longitudinal adjustment of the latter within said tubular leg. The lower end of said shaft 22 is provided with a circular base 23 which is designed to rest on the ground when the jack is in use, and projecting laterally from said base is a short, upwardly-angled arm 24 to which a conventional automobile jack handle or the like can be removably attached to facilitate the turning of said shaft 22.

In the normal use of the novel jack assembly comprising the present invention, a plurality of said jacks are mounted on the underside of a trailer, such as the house trailer 26 illustrated in FIG. 4. Ordinarily, four of such jacks would be mounted on the trailer, one at each corner thereof, but it is to be understood that the number of jacks employed and the positioning of the same on the trailer may vary according to the requirements and size of the particular trailer, and the invention is not to be limited in this respect.

When it is desired to raise and support the trailer by means of said jacks, the pivotal leg 19 on each is positioned vertically, as in FIG. 1, and the threaded shaft 22 therein is manually turned downwardly until the base member 23 thereon engages the ground. Further turning of said shaft 22 then causes the trailer to be raised. Ordinarily, the trailer is raised only slightly, just so that its entire weight is not borne by the wheels, but the degree of elevation is a matter of preference and depends in part on the evenness of the ground. When all of said jacks have been similarly extended the trailer is supported thereby on an even plane, and the possibility of said trailer tilting or rocking when its occupants move about is eliminated. Moreover, of course, with the present permanently-mounted jacks it is unnecessary to laboriously gather and position concrete blocks or the like under the trailer in order to support the same in an elevated condition, the jacks themselves performing that function in the present invention.

One of the principal features of the present jack assembly is the novel means incorporated therein for maintaining the jack in its load-supporting position, and eliminating the possibility of the leg 19 inadvertently swinging upwardly under the pressure of the load. In this respect, attention is directed to the aforementioned retaining bar 25 carried by and between the bracket side walls 15 and 15'. Due to the vertically-slidable nature of said bar 25 within the elongated slots 16 and 16', when the leg 19 is in its vertical, load-supporting position said bar falls by its own weight to a position at the bottom of said slots (FIGS. 1 and 2). In the latter postion said retaining bar abuts against the leg 19 below the pivotal connection provided by the bolt 17, and prevents said leg from swinging upwardly thereabout. Inasmuch as the bracket bottom wall 14 prevents rearward swinging movement of said arm 19, as hereinabove described, the stability of the load is thus ensured.

When it is desired to lower the trailer the shaft 22 on each jack is rotated in a direction opposite to that in which it was turned to elevate the trailer, until the trailer is again resting on its wheels and the jack base members 23 are spaced above the ground. In accordance with the present invention, and as will now be described, the entire pivotal leg assembly of each jack may then be swung to an unobtrusive horizontal position where it will not interfere with the normal use of the trailer, or detract from the appearance thereof.

As hereinabove described, the retaining bar 25 automatically falls to a position at the bottom of the slots 16 and 16' when the arm 19 is in a vertical condition, thus preventing the inadvertent pivotal movement of said arm while the jack is supporting a load. To swing said arm upwardly, however, said retaining bar may be manually raised to a position at the top of said slots, and the arm 19 then swung to the horizontal poistion illustrated in FIG. 3. In the latter position the jack is arranged closely against the underside of the trailer, and will not affect either the normal operation or appearance of the same. In order to releasably maintain said arm 19 in its raised position the present jack is provided with a novel locking assembly which is considerably simpler than the complex mechanisms employed on prior trailer jacks. In this respect, and as hereinabove mentioned, the bracket side walls 15 and 15' are provided with aligned apertures 18 adjacent their rearward edges, and the upper end of the arm 19 is provided with a similar aperture 21 which is designed to register with said wall apertures when said arm is in its horizontal positoin. When said arm is in the latter position a key 27 (FIGS. 3 and 5) is adapted to be inserted into and completely through said registering wall and arm apertures, and to thus prevent pivotal movement of said arm.

As will be seen in FIG. 5, the key 27 has a small transverse lug 28 formed on its outer end, and in order to insert said key into the apertures 18 and 21 as described, said lug must be positioned in alignment with the registering extensions 18' and 21' formed in said apertures. After the key has been projected through said apertures it is rotated to move said lug out of alignment with said aperture extensions, and the inadvertent withdrawal of said key is thus prohibited. When it is desired to release the arm 19 and to swing the same downwardly to its load-supporting position, the key 27 is rotated to again position the lug 28 thereon in alignment with the aperture extensions. The key may then be easily withdrawn and the arm swung downwardly about its pivot connection. The key 27 in the present invention may be permanently attached to the jack by means of a short length of chain or the like, to prevent its loss, but this is not critical to the invention.

From the foregoing detailed description it will be seen that the present invention provides a novel jack assembly which is designed particularly for use on house trailers, and which has several important advantages over the jack devices now in use for the same general purpose. For one thing, of course, the simplified structure comprising the present invention is substantially less expensive in design and construction as compared to said prior devices, and is better adapted for rugged use. Moreover, the present device may be readily positioned in either a vertical, load-supporting position, or in an unobstructing, horizontal position against the underside of the trailer, and it may be easily releasably locked in either position.

It is to be understood, of course, that while the preferred form of the present invention is illustrated and described herein in considerable detail, the invention is by no means to be limited to a structure including all of the details shown. Various modifications or alterations will undoubtedly suggest themselves to those skilled in the art upon a reading of the foregoing description, and all of such changes and modifications are contemplated as may come within the spirit of the invention and within the scope of the claims appended hereto. It is also to be clearly understood that while the jack comprising the present invention has been described as primarily intended for use on house trailers, the invention is not to be limited in this respect. It is possible, for example, to use the novel features of the present jack assembly to great advantage on trailers designed for hauling boats or other objects, and it is conceivable that a jack embodying the features of the invention might have considerable utility in many other and diverse fields, and it is not to be limited to use on a trailer or vehicle.

With all of the above considerations in mind, what I claim is:

1. A jack, comprising: a bracket adapted to be secured to the underside of a structure, said bracket being provided with a pair of parallel side walls having aligned, vertical slotted openings therethrough adjacent their forward edges; a tubular leg member supported by and normally depending from said bracket, there being means adjacent the upper end of said leg pivotally securing the same to and between said bracket side walls in a manner whereby said leg can be swung forwardly and upwardly about said connection from its normal vertical position to a horizontal position; a shaft longitudinally adjustably carried in and projecting from the lower end of said leg, said shaft having a base on its lower end; a retaining bar vertically slidably carried by and between the slotted openings in said bracket side walls, said retaining bar being movable from a position at the bottom of said slotted openings wherein it prevents upward swinging movement of said pivotal leg member, to a position adjacent the top of said slotted openings wherein it will not interfere with the upward and forward swinging of said leg to a horizontal position; and means on said jack adapted to releasably maintain said leg member in a horizontal position.

2. A jack, comprising: a bracket adapted to be secured to the underside of a structure, said bracket having an open front face and a pair of parallel side walls having aligned, vertical slotted openings therethrough adjacent their forward edges and aligned apertures therethrough adjacent their rearward edges; a tubular leg member supported by and normally depending from said bracket, there being means adjacent the upper end of said leg pivotally securing the same to and between said bracket side walls in a manner whereby said leg can be swung forwardly and upwardly about said connection from its normal vertical position to a horizontal position, and there being an aperture through said leg adjacent its upper end which is positioned to register with said bracket side wall apertures when said leg is a horizontal position; a shaft longitudinally adjustably carried in and projecting from the lower end of said leg, said shaft having a base on its lower end; a retaining bar vertically slidably carried by and between the slotted openings in said bracket side walls, said retaining bar being movable from a position at the bottom of said slotted openings wherein it prevents upward swinging movement of said leg, to a position adjacent the top of said slotted openings wherein it will not interfere with the upward and forward swinging of said leg to a horizontal position; and a key removably insertable into said registering leg and bracket wall apertures when said leg member is in a horizontal position to releasably maintain the same in said position.

3. A jack, comprising: a bracket adapted to be permanently secured to the underside of a structure, said bracket having an open front face and a pair of parallel side walls having aligned, vertical slotted openings therethrough adjacent their forward edges and aligned apertures therethrough adjacent their rearward edges, said apertures having relatively small, aligned extensions formed therein; a tubular leg member supported by and normally depending from said bracket, there being means adjacent the upper end of said leg pivotally connecting the same to and between said bracket side walls in a manner whereby said leg can be swung forwardly and upwardly about said connection from its normal vertical position to a horizontal position, and there being an aperture through said leg adjacent its upper end which is positioned to register with said bracket side wall apertures when said leg is in a horizontal position; a shaft longitudinally adjustably carried in and projecting from the lower end of said leg, said shaft having a base on its lower end; a retaining bar vertically slidably carried by and between the slotted openings in said bracket side walls, said retaining bar being manually movable from a position at the bottom of said slotted openings, wherein it abuts said leg member below its pivot connection and prevents upward swinging movement of the same, to a position adjacent the top of said slotted openings wherein it will not interfere with the upward and forward swinging of said leg to a horizontal position; and a key removably insertable into said registering leg and bracket wall apertures when said leg member is in a horizontal position to maintain the same in said position, said key having a transverse lug on its outer end which is positionable in alignment with said aperture extensions during the insertion or removal of said key, and which lug may be turned out of alignment with said aperture extensions to prevent the inadvertent withdrawal of said key after it has been inserted into and through said wall and leg members.

4. A jack, comprising: a bracket adapted to be permanently secured to the underside of a structure, said bracket having a pair of parallel side walls, an open front face, and a partial bottom wall having a concave forward edge, said bracket side walls having aligned, vertical slotted openings therethrough adjacent their forward edges and having aligned apertures therethrough adjacent their rearward edges, said apertures having relatively small, aligned extensions formed therein; a tubular leg member supported by and normally depending from said bracket, there being means adjacent the upper end of said leg pivotally connecting the same to and between said bracket side walls in a manner whereby said leg can be swung forwardly and upwardly about said connection from its normal vertical position wherein it abuts against the forward edge of said bracket bottom wall to a horizontal position, there being an aperture through said leg adjacent its upper end which is positioned to register with said bracket side wall apertures when said leg is in a horizontal position, and said leg having an internally threaded lower end portion; a shaft threaded into and projecting from the lower end of said leg, said shaft having a base on its lower end, and said shaft having turning means associated therewith; a retaining bar vertically slidably carried by and between the slotted openings in said bracket side walls, said retaining bar being manually movable from a position at the bottom of said slotted openings, wherein it abuts said leg member below its pivot connection and prevents upward swinging movement of the same, to a position adjacent the top of said slotted openings, and wherein it will not interfere with the upward and forward swinging of said leg to a horizontal position; and a key removably insertable into said registering leg and bracket wall apertures when said leg member is in a horizontal position to maintain the same in said position, said key having a transverse lug on its outer end which is positionable in alignment with said aperture extensions during the insertion or removal of said key, and which lug may be turned out of alignment with said aperture extensions to prevent the inadvertent withdrawal of said key after it has been inserted into and through said wall and leg members.

References Cited in the file of this patent

UNITED STATES PATENTS

| | | |
|---|---|---|
| 2,595,453 | Gilmore | May 6, 1952 |
| 2,734,726 | Gebhart | Feb. 14, 1956 |
| 2,853,316 | Moss | Sept. 23, 1958 |

FOREIGN PATENTS

| | | |
|---|---|---|
| 192,274 | Switzerland | Oct. 1, 1937 |
| 632,974 | Great Britain | Dec. 5, 1949 |
| 512,117 | Belgium | July 15, 1952 |